United States Patent
Nishio

(10) Patent No.: US 10,651,621 B2
(45) Date of Patent: May 12, 2020

(54) LASER APPARATUS INCLUDING HEAT TRANSFER DEVICE FOR RELEASING HEAT INSIDE HOUSING TO THE OUTSIDE

(71) Applicant: Fanuc Corporation, Yamanashi (JP)

(72) Inventor: Akihiko Nishio, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/377,942

(22) Filed: Apr. 8, 2019

(65) Prior Publication Data

US 2019/0319421 A1 Oct. 17, 2019

(30) Foreign Application Priority Data

Apr. 12, 2018 (JP) ................ 2018-077116

(51) Int. Cl.
*H01S 3/04* (2006.01)
*H01S 3/067* (2006.01)

(52) U.S. Cl.
CPC .......... *H01S 3/0404* (2013.01); *H01S 3/0407* (2013.01); *H01S 3/06704* (2013.01)

(58) Field of Classification Search
CPC ...... H01S 3/06704; H01S 3/0407; H01S 3/00; H01S 3/041; H01L 23/38
USPC .................................................. 372/35, 34
See application file for complete search history.

(56) References Cited

U.S. PATENT DOCUMENTS

| | | | |
|---|---|---|---|
| 8,699,533 B1* | 4/2014 | Wach | H01S 5/02212 372/34 |
| 2009/0022185 A1* | 1/2009 | Machida | H01S 5/024 372/20 |
| 2014/0105237 A1* | 4/2014 | Hayashikawa | H01S 3/036 372/58 |

FOREIGN PATENT DOCUMENTS

| | | |
|---|---|---|
| JP | H03-43739 U | 4/1991 |
| JP | 2002-22332 A | 1/2002 |
| JP | 2008-141089 A | 6/2008 |
| JP | 2016-219456 A | 12/2016 |

* cited by examiner

*Primary Examiner* — Tuan N Nguyen
(74) *Attorney, Agent, or Firm* — RatnerPrestia

(57) ABSTRACT

A laser apparatus includes a heat transfer device having a cooling fin at a temperature lower than that of a heat radiation jacket, and a cooling fan. A controller controls the cooling fan so as to be stopped when temperature detected by a temperature sensor is lower than a temperature reference value and humidity detected by a humidity sensor is higher than a humidity reference value. The controller controls the cooling fan so as to be driven when temperature detected by the temperature sensor is higher than the temperature reference value and humidity detected by the humidity sensor is lower than the humidity reference value.

11 Claims, 8 Drawing Sheets

LASER APPARATUS INCLUDING HEAT TRANSFER DEVICE FOR RELEASING HEAT INSIDE HOUSING TO THE OUTSIDE

CROSS-REFERENCE TO RELATED APPLICATIONS

This application is a new U.S. patent application that claims benefit of Japanese Patent Application No. 2018-077116, filed Apr. 12, 2018, the disclosure of this application is being incorporated herein by reference in its entirety for all purposes.

BACKGROUND OF THE INVENTION

1. Field of the Invention

The present invention relates to a laser apparatus including a heat transfer device for releasing heat inside a housing to the outside.

2. Description of the Related Art

A laser apparatus includes a housing inside which a laser resonator, a laser power source that supplies electricity to the laser resonator, and the like are disposed. Inside the housing, condensation may occur in devices included in the laser apparatus. For example, inside the housing, temperature rises due to heat released from a device generating the heat. Accordingly, a cooling mechanism for cooling the device inside the housing is disposed in the laser apparatus. When air with a high humidity is brought into contact with a portion that is cooled by the cooling mechanism and reduced in temperature, a water droplet is generated by condensation. This kind of water droplet may cause a failure in a device included in the laser apparatus.

For example, in a laser apparatus including an optical fiber, the optical fiber may break down due to condensation. In a laser apparatus including a laser diode as a light emitting source, the laser diode may beak down due to a short-circuit when a water droplet adheres to an electrode of the laser diode. Furthermore, in a carbonic acid gas laser apparatus, a high voltage is applied in order to perform laser oscillation. As a result, when condensation occurs inside the laser apparatus, a spark may be generated so to damage an electrode. Besides these, when a water droplet adheres to a device included in a laser apparatus, the device may break down due to contamination or erosion.

In the related art, there is known a laser apparatus that predicts an occurrence of condensation in an interior space of a housing, and controls supply of cooling water so as to prevent an occurrence of condensation (e.g., Japanese Unexamined Patent Publication No. 2016-219456A). There is also known a laser apparatus including a device for dehumidifying an interior space of a housing (e.g., Japanese Unexamined Patent Publication No. 2002-22332A, Japanese Unexamined Patent Publication No. 2008-141089A, and Japanese Unexamined Utility Model Publication No. 3-43739U).

SUMMARY OF THE INVENTION

A laser apparatus may stop in order to suppress condensation when humidity inside a housing is high, while transmitting an alarm. Increase in temperature in an interior space of the housing may cause a failure in a device. Thus, when temperature inside the housing is high, the laser apparatus may stop in order to suppress a failure in a device, while transmitting an alarm.

It is known to dispose a device for adjusting humidity in order to prevent humidity in an interior space of a laser apparatus from increasing excessively. The device for adjusting humidity includes a low-temperature part in which temperature is reduced by using a Peltier element, for example. The device for adjusting humidity is capable of reducing humidity inside a housing by condensation occurring in the low-temperature part.

When the device for adjusting humidity is driven, the low-temperature part is reduced in temperature and air inside the housing is cooled. That is, the device for adjusting humidity has a function of performing dehumidification and a function of reducing temperature of air. Thus, it is preferable to control the device so as to dehumidify and cool air efficiently.

In addition, a laser apparatus may include a fan for stirring air inside the housing, or a drain device for discharging water generated due to condensation, along with a device for adjusting temperature or humidity. It is preferable to control also the fan and the drain device so as to enable temperature or humidity inside the housing to be efficiently adjusted.

As described above, it is preferable that a laser apparatus controls a device included in the laser apparatus such that temperature and humidity in an interior space of a housing are each adjusted within an appropriate range.

A laser apparatus of a first aspect of the present disclosure includes a laser resonator configured to oscillate a laser beam and a housing configured to seal a space in which the laser resonator is disposed in an airtight manner. The laser apparatus includes a temperature sensor configured to detect temperature of air inside the housing and a humidity sensor configured to detect humidity of the air inside the housing. The laser apparatus includes a heat transfer device having a high-temperature part, a low-temperature part at a temperature lower than that of the high-temperature part, the low-temperature part being disposed inside the housing, and a cooling fan configured to generate a flow of air in the low-temperature part, and configured to transfer heat in the low-temperature part to the high-temperature part. The laser apparatus includes a controller having an operation control unit configured to control the cooling fan and a storage unit configured to store predetermined information. The storage unit stores a temperature reference value associated with temperature for control of the cooling fan and a humidity reference value associated with humidity for control of the cooling fan. The operation control unit performs control of stopping the cooling fan when temperature detected by the temperature sensor is lower than the temperature reference value and humidity detected by the humidity sensor is higher than the humidity reference value. The operation control unit performs control of driving the cooling fan when temperature detected by the temperature sensor is higher than the temperature reference value and humidity detected by the humidity sensor is lower than the humidity reference value.

A laser apparatus of a second aspect of the present disclosure includes a laser resonator configured to oscillate a laser beam, and a housing configured to seal a space in which the laser resonator is disposed in an airtight manner. The laser apparatus includes a temperature sensor configured to detect temperature of air inside the housing and a humidity sensor configured to detect humidity of the air inside the housing. The laser apparatus includes a heat transfer device having a high-temperature part, a low-temperature part at a temperature lower than that of the high-temperature part, the low-temperature part being disposed inside the housing, and a cooling fan configured to generate a flow of air in the low-temperature part, and configured to transfer heat in the low-temperature part to the high-temperature part. The laser apparatus includes a controller having an operation control unit configured to control the cooling fan, and a storage unit configured to store predetermined information. The storage unit stores a temperature reference value associated with temperature for control of the cooling fan and a humidity reference value associated with humidity for control of the cooling fan. The operation control unit performs control of varying rotation speed of the cooling fan in a predetermined cycle when temperature detected by the temperature sensor is lower than the temperature reference value and humidity detected by the humidity sensor is higher than the humidity reference value. The operation control unit stops the control of varying rotation speed of the cooling fan in the predetermined cycle in at least one case among a case where temperature detected by the temperature sensor is higher than the temperature reference value and a case where humidity detected by the humidity sensor is lower than the humidity reference value.

A laser apparatus of a third aspect of the present disclosure includes a laser resonator configured to oscillate a laser beam, and a housing configured to seal a space in which the laser resonator is disposed in an airtight manner. The laser apparatus includes a temperature sensor configured to detect temperature of air inside the housing, and a humidity sensor configured to detect humidity of the air inside the housing. The laser apparatus includes at least one fan configured to stir air inside the housing. The laser apparatus includes a heat transfer device having a high-temperature part and a low-temperature part at a temperature lower than that of the high-temperature part, the low-temperature part being disposed inside the housing, and configured to transfer heat in the low-temperature part to the high-temperature part. The laser apparatus includes a controller having an operation control unit configured to control the fan and a storage unit configured to store predetermined information. The fan includes at least one of a stirring fan disposed at a position away from the heat transfer device and a cooling fan disposed in the heat transfer device so as to generate a flow of air in the low-temperature part. The storage unit stores a temperature reference value associated with temperature and a humidity reference value associated with humidity, for control of the fan. The operation control unit performs control of varying rotation direction of an impeller of at least one of the stirring fan and the cooling fan in a predetermined cycle when temperature detected by the temperature sensor is higher than the temperature reference value and humidity detected by the humidity sensor is lower than the humidity reference value. The operation control unit stops the control of varying rotation direction of the impeller in the predetermined cycle in at least one case among a case where temperature detected by the temperature sensor is lower than the temperature reference value and a case where humidity detected by the humidity sensor is higher than the humidity reference value.

A laser apparatus of a fourth aspect of the present disclosure includes a laser resonator configured to oscillate a laser beam, and a housing configured to seal a space in which the laser resonator is disposed in an airtight manner. The laser apparatus includes a temperature sensor configured to detect temperature of air inside the housing, and a humidity sensor configured to detect humidity of the air inside the housing. The laser apparatus includes a heat transfer device having a high-temperature part and a low-temperature part at a temperature lower than that of the high-temperature part, the low-temperature part being disposed inside the housing, and configured to transfer heat in the low-temperature part to the high-temperature part. The laser apparatus includes a water storage part configured to store water generated in the low-temperature part due to condensation, a water storage sensor configured to detect an amount of water stored in the water storage part, and a drain device configured to discharge the water stored in the water storage part to the outside of the housing. The laser apparatus includes a controller having an operation control unit configured to control the drain device and a storage unit configured to store predetermined information. The storage unit stores a temperature reference value associated with temperature, a humidity reference value associated with humidity, and a stored-water-amount reference value associated with the amount of water stored in the water storage part, for control of the drain device. The operation control unit controls the drain device so as to drain water in the water storage part in a predetermined cycle when temperature detected by the temperature sensor is lower than the temperature reference value and humidity detected by the humidity sensor is higher than the humidity reference value. When temperature detected by the temperature sensor is higher than the temperature reference value and humidity detected by the humidity sensor is lower than the humidity reference value, the operation control unit controls the drain device so as to drain water in the water storage part in a case where the amount of water in the water storage part exceeds the stored-water-amount reference value.

A laser apparatus of a fifth aspect of the present disclosure includes a laser resonator configured to oscillate a laser beam, a housing configured to seal a space in which the laser resonator is disposed in an airtight manner, and a plurality of temperature sensors each configured to detect temperature of air inside the housing. The laser apparatus includes at least one fan configured to stir air inside the housing. The laser apparatus includes a heat transfer device having a high-temperature part and a low-temperature part at a temperature lower than that of the high-temperature part, the low-temperature part being disposed inside the housing, and configured to transfer heat in the low-temperature part to the high-temperature part. The laser apparatus includes a controller having an operation control unit configured to control the fan and a storage unit configured to store predetermined information. The fan includes at least one of a stirring fan disposed at a position away from the heat transfer device, and a cooling fan disposed in the heat transfer device so as to generate a flow of air in the low-temperature part. The plurality of temperature sensors are disposed at respective positions away from each other inside the housing. The storage unit stores a temperature-distribution reference value with respect to a variable associated with temperature distribution inside the housing. The operation control unit calculates the variable associated with temperature distribution on the basis of temperatures detected by the plurality of temperature sensors. The operation control unit controls at least one of the stirring fan and the cooling fan so as to operate when the variable associated with temperature distribution is more than the temperature-distribution reference value. The operation control unit controls at least one of the stirring fan and the cooling fan so as to be stopped when the variable associated with temperature distribution is less than the temperature-distribution reference value.

A laser apparatus of a sixth aspect of the present disclosure includes a laser resonator configured to oscillate a laser beam, a housing configured to seal a space in which the laser resonator is disposed in an airtight manner, and a plurality of humidity sensors each configured to detect humidity of air inside the housing. The laser apparatus includes at least one fan configured to stir air inside the housing. The laser apparatus includes a heat transfer device having a high-temperature part and a low-temperature part at a temperature lower than that of the high-temperature part, the low-temperature part being disposed inside the housing, and configured to transfer heat in the low-temperature part to the high-temperature part. The laser apparatus includes a controller having an operation control unit configured to control the fan and a storage unit configured to store predetermined information. The fan includes at least one of a stirring fan disposed at a position away from the heat transfer device, and a cooling fan disposed in the heat transfer device so as to generate a flow of air in the low-temperature part. The plurality humidity sensors is disposed at respective positions away from each other inside the housing. The storage unit stores a humidity-distribution reference value with respect to a variable associated with humidity distribution inside the housing. The operation control unit calculates the variable associated with humidity distribution on the basis of relative humidity detected by the plurality of humidity sensors. The operation control unit controls at least one of the stirring fan and the cooling fan so as to operate when the variable associated with humidity distribution is more than the humidity-distribution reference value. The operation control unit controls at least one of the stirring fan and the cooling fan so as to be stopped when the variable associated with humidity distribution is less than the humidity-distribution reference value.

DETAILED DESCRIPTION

First Embodiment

Figure 1:
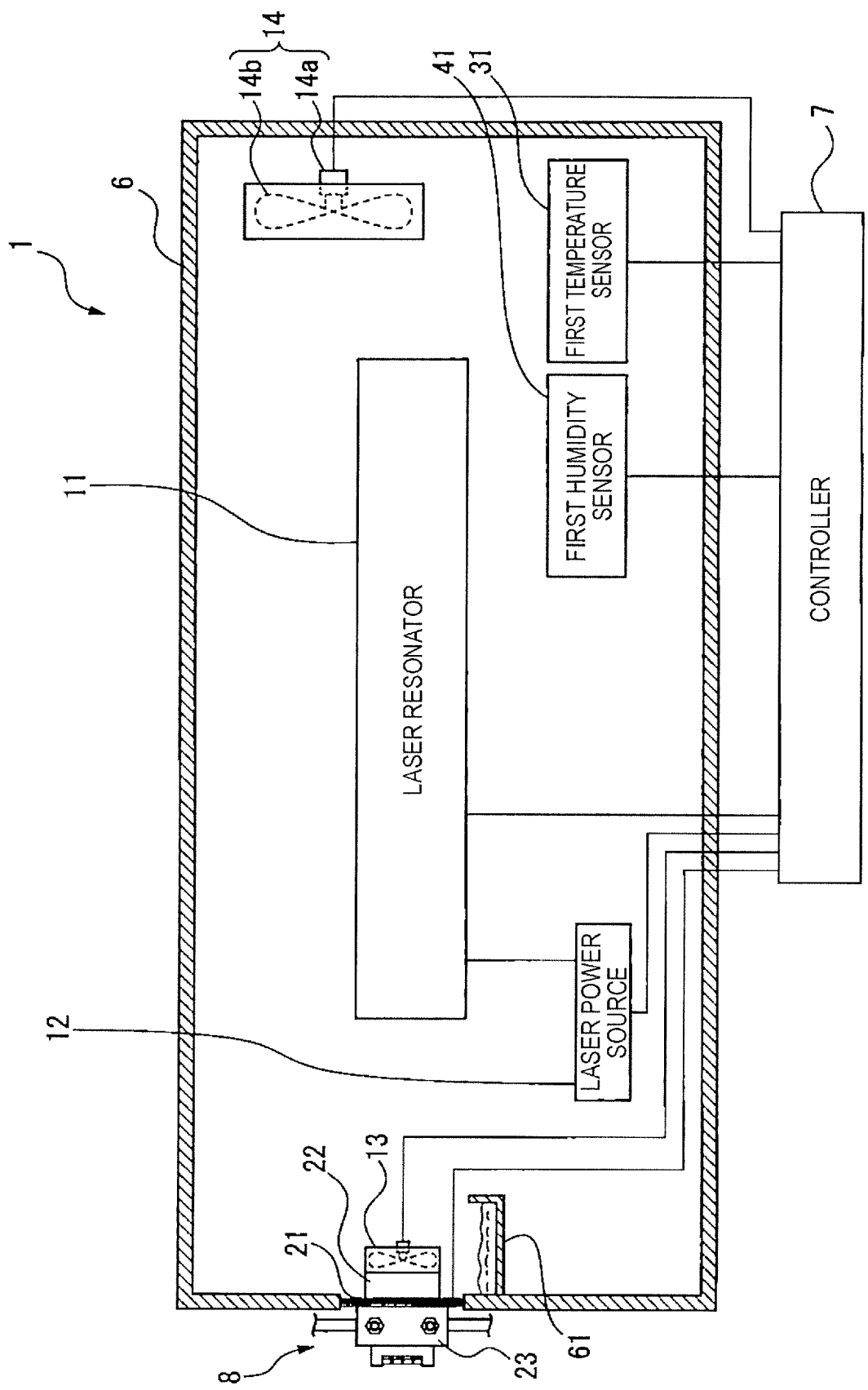
FIG. 1 is a schematic view of a laser apparatus of a first embodiment.

With reference to FIGS. 1 to 6, a laser apparatus of a first embodiment will be described. In an embodiment, a fiber laser apparatus that excites light in an optical fiber among various kinds of laser apparatus will be described as an example.
FIG. 1 shows a schematic view of a laser apparatus of the present embodiment. A laser apparatus 1 includes a laser resonator 11 configured to oscillate a laser beam. The laser resonator 11 of the present embodiment includes an optical fiber serving as a medium for amplifying light. The laser apparatus 1 includes a housing 6. The housing 6 has sealed structure so as to seal a space in which a device such as the laser resonator 11 is disposed in an airtight manner. For example, a seal member made of rubber is interposed between plate-like members constituting the housing 6. The housing 6 sealed in an airtight manner enables control of temperature and humidity of air inside the housing 6.

The laser apparatus 1 includes a laser power source 12 that supplies electricity to a light emitting source of the laser resonator 11. In the present embodiment, electricity is supplied to a heat transfer device 8 and a stirring fan 14 from another power source. The laser apparatus 1 includes a heat transfer device 8 configured to release heat of air inside the housing 6 to the outside of the housing 6. The heat transfer device 8 of the present embodiment serves as a dehumidifier that dehumidifies air inside the housing 6. The heat transfer device 8 also serves as a cooler that cools air inside the housing 6. The heat transfer device 8 of the present embodiment is fixed to the housing 6. More specifically, the heat transfer device 8 of the present embodiment is disposed in a hole formed in the housing 6.

Figure 2:
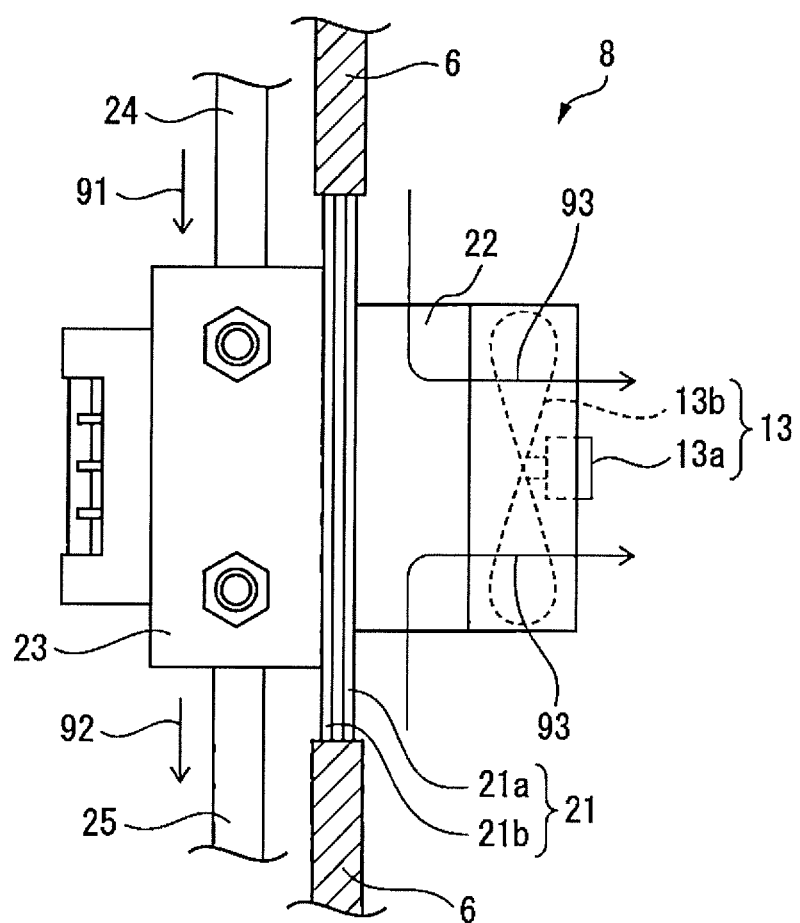
FIG. 2 is an enlarged schematic view of a heat transfer device of an embodiment.

FIG. 2 shows an enlarged schematic sectional view of the heat transfer device of the present embodiment. With reference to FIGS. 1 and 2, the heat transfer device 8 of the present embodiment is an electronic cooler. The heat transfer device 8 includes a Peltier element 21. The Peltier element 21 includes a low-temperature plate 21a that is reduced in temperature by supply of electricity, and a high-temperature plate 21b that has a temperature more than that of the low-temperature plate 21a. Between the low-temperature plate 21a and the high-temperature plate 21b, a thermoelectric semiconductor is interposed. The Peltier element 21 is driven so as to transfer heat from the low-temperature plate 21a to the high-temperature plate 21b by using a function of the thermoelectric semiconductor.

The high-temperature plate 21b is provided with a heat radiation jacket 23 fixed that serves as a high-temperature part. The heat radiation jacket 23 is disposed outside the housing 6. The low-temperature plate 21a is connected to a cooling fin 22 serving as a low-temperature part that is lower in temperature than the high-temperature part. The cooling fin 22 is disposed inside the housing 6.

The heat radiation jacket 23 is a heat exchanger that is cooled by cooling water. The heat radiation jacket 23 is connected to cooling water pipes 24 and 25 for supplying cooling water. The cooling water is supplied to the heat radiation jacket 23 through the cooling water pipe 24 as indicated by an arrow 91. Inside the heat radiation jacket 23, a pipe allowing the cooling water to flow therethrough is inserted. Inside the heat radiation jacket 23, the cooling water having been subjected to heat exchange is discharged through the cooling water pipe 25 as indicated by an arrow 92.

The heat transfer device 8 includes a cooling fan 13 for causing air to flow in the cooling fin 22. The cooling fan 13 includes an impeller 13b, and a fan motor 13a that rotates the impeller 13b. The cooling fan 13 is driven so as to generate a flow of air in the cooling fin 22 as indicated by an arrow 93. The Peltier element 21 is driven so as to transfer heat of the cooling fin 22 to the heat radiation jacket 23. Thus, the cooling fin 22 is reduced in temperature. When air causes condensation on a surface of the cooling fin 22, air inside the housing 6 can be dehumidified. The laser apparatus 1 includes a water storage tank 61 serving as a water storage part that stores water caused by condensation in the cooling fin 22. Water droplets having adhered to the cooling fin 22 drop so as to be collected in the water storage tank 61. The water droplets collected in the water storage tank 61 are discharged to the outside of the housing 6.

Furthermore, a flow of air can be generated inside the housing 6 by driving the cooling fan 13. Thus, the cooling fan 13 also has a function of stirring air inside the housing 6.

As the heat transfer device, there is available any device capable of transferring heat in a low-temperature part to a high-temperature part so as to transfer heat inside the housing to the outside of the housing. For example, the heat transfer device can include a heat pump chiller having a compressor and an expansion valve. The heat radiation jacket disposed outside the housing can be fixed to the cooling fin disposed inside the housing. Then, a refrigerant reduced in temperature is supplied to the heat radiation jacket so as to enable the cooling fin to be cooled. While the high-temperature part is disposed outside the housing in the present embodiment, the high-temperature part is not limited to this aspect. The high-temperature part may be disposed inside the housing. In this case, the high-temperature part can be cooled by using cooling water, for example. The cooling water having cooled the high-temperature part can be cooled by using a heat exchanger disposed outside the housing, or the like. That is, heat in the high-temperature part can be transferred to the outside of the housing by using cooling water or the like.

With reference to FIG. 1, the laser apparatus 1 includes the stirring fan 14 that stirs air inside the housing 6. The stirring fan 14 includes an impeller 14b, and a fan motor 14a that rotates the impeller 14b. The stirring fan 14 is disposed inside the housing 6. The stirring fan 14 is disposed at a position away from the heat transfer device 8. In the present embodiment, the stirring fan 14 is larger in size than the cooling fan 13 of the heat transfer device 8. While one stirring fan is disposed inside the housing in the present embodiment, the stirring fan is not limited to this aspect, and thus a plurality of stirring fans may be disposed inside the housing.

The laser apparatus 1 includes a controller 7. The controller 7 of the present embodiment is composed of an arithmetic processing device (calculator) including a central processing unit (CPU), a random access memory (RAM), and the like. The controller 7 controls a laser power source 12 and the laser resonator 11. The controller 7 also controls the heat transfer device 8 and the stirring fan 14. In particular, the controller 7 controls the cooling fan 13 and the Peltier element 21 of the heat transfer device 8.

The laser apparatus 1 includes a first temperature sensor 31 that detects temperature of air inside the housing 6. The laser apparatus 1 also includes a first humidity sensor 41 that detects humidity of air inside the housing 6. The first temperature sensor 31 and the first humidity sensor 41 are disposed inside the housing 6. The controller 7 receives a signal of the temperature detected by the temperature sensor 31 and a signal of the humidity detected by the humidity sensor 41.

Devices included in the laser apparatus 1, such as the heat transfer device 8, the laser resonator 11, the laser power source 12, and the stirring fan 14, are disposed inside the housing 6. These devices included in the laser apparatus 1 are driven so as to generate heat. This results in increase in temperature of air inside the housing 6. While the controller 7 of the present embodiment is disposed outside the housing 6, the controller 7 is not limited to this aspect. The controller 7 may be disposed inside the housing 6.

Figure 3:
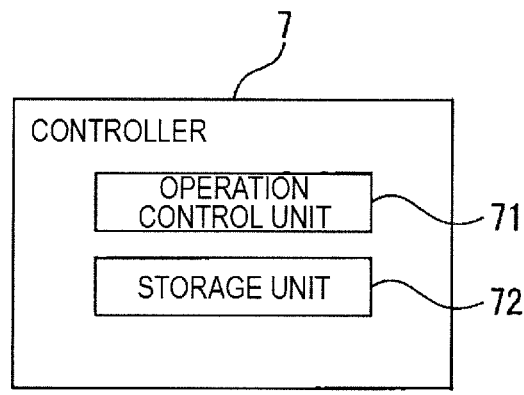
FIG. 3 is a block diagram of a controller of the embodiment.

FIG. 3 shows a block diagram of the controller of the present embodiment. The controller 7 includes an operation control unit 71 that transmits an actuation command to each of the devices included in the laser apparatus 1. The operation control unit 71 controls the laser power source 12 and the laser resonator 11. The operation control unit 71 also controls the heat transfer device 8 and the stirring fan 14. The controller 7 includes a storage unit 72 that stores predetermined information such as an operation program and a reference value. The operation control unit 71 controls each of the devices on the basis of the information stored in the storage unit 72. The operation control unit 71 also controls each of the devices on the basis of temperature detected by the first temperature sensor 31 and humidity detected by the first humidity sensor 41.

Figure 4:
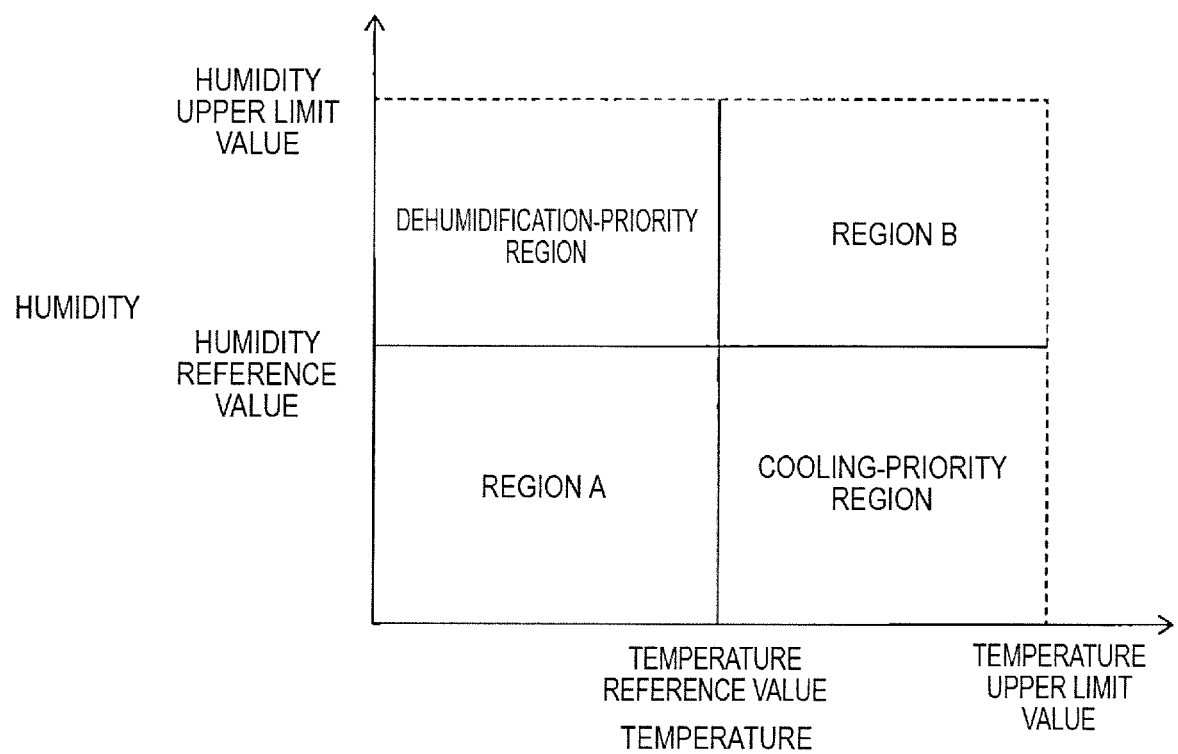
FIG. 4 is a diagram for illustrating regions for control of the laser apparatus.

FIG. 4 shows a graph for illustrating regions for control of the laser apparatus of the present embodiment. In the laser apparatus 1, a humidity upper limit value for automatically stopping the laser apparatus 1 is predetermined. In addition, a temperature upper limit value for automatically stopping the laser apparatus 1 is predetermined. The humidity upper limit value and the temperature upper limit value are stored in the storage unit 72. The controller 7 acquires humidity of air inside the housing 6 from the humidity sensor 41. The controller 7 also acquires temperature of the air inside the housing 6 from the temperature sensor 31. The controller 7 compares the acquired temperature and humidity with the corresponding upper limit values. The controller 7 performs control of stopping the laser apparatus 1 in at least one case among a case where humidity of air inside the housing 6 exceeds the humidity upper limit value and a case where temperature of air inside the housing 6 exceeds the temperature upper limit value. That is, a region in which temperature of air inside the housing 6 is equal to or less than the temperature upper limit value and humidity of air inside the housing 6 is equal to or less than the humidity upper limit value, corresponds to a range in which the laser apparatus 1 can be operated.

In the present embodiment, a temperature reference value and a humidity reference value, for controlling at least one of the cooling fan 13 of the heat transfer device 8 and the stirring fan 14, are predetermined. The temperature reference value and the humidity reference value are stored in the storage unit 72.

The humidity reference value is set to a value lower than humidity in which devices included in the laser apparatus 1 are liable to break down. For example, humidity that is lower than a value in which an electronic component included in the devices does not break down, is selected. The humidity reference value is also set to be lower than the humidity upper limit value. As with the humidity reference value, the temperature reference value is set to a value lower than temperature at which the devices included in the laser apparatus 1 are liable to break down. The temperature reference value is also set to be lower than the temperature upper limit value.

In the present embodiment, an operation region having a temperature less than the temperature reference value and humidity equal to or more than the humidity reference value is referred to as a dehumidification-priority region. The dehumidification-priority region is a region having a low temperature and high humidity. The dehumidification-priority region is close to a region having humidity in which each of the devices included in the laser apparatus 1 breaks down. Accordingly, in the first control of the laser apparatus 1, the control of dehumidifying air inside the housing 6 is performed with priority higher than the control of cooling the air in the dehumidification-priority region.

In addition, an operation region having a temperature equal to or more than the temperature reference value and humidity less than the humidity reference value is referred to as a cooling-priority region. The cooling-priority region is a region having low humidity and a high temperature. The cooling-priority region is close to a region having a temperature at which each of the devices included in the laser apparatus 1 breaks down. Accordingly, in the first control of the laser apparatus 1, the control of cooling the air inside the housing 6 is performed with priority higher than the control of dehumidifying the air in the cooling-priority region.

With reference to FIGS. 1 to 4, the operation control unit 71 of the controller 7 acquires temperature of air inside the housing 6 from the temperature sensor 31. The operation control unit 71 also acquires humidity of air inside the housing 6 from the humidity sensor 41. The operation control unit 71 compares the temperature acquired by the temperature sensor 31 with the temperature reference value. The operation control unit 71 also compares the humidity acquired by the humidity sensor 41 with the humidity reference value. The operation control unit 71 controls the cooling fan 13 of the heat transfer device 8 so as to be stopped when temperature detected by the temperature sensor 31 is lower than the temperature reference value and humidity detected by the humidity sensor 41 is equal to or higher than the humidity reference value.

Temperature of the cooling fin 22 is reduced by driving the heat transfer device 8. Air flow into the cooling fin 22 is generated by driving the cooling fan 13 as indicated by the arrow 93 so as to promote heat exchange. In contrast, air inside the housing 6 can be prevented from continuously colliding with the cooling fin 22 by stopping the cooling fan 13. Thus, temperature of the cooling fin 22 can be reduced more than the state in which the cooling fan 13 is driven. As a result, an occurrence of condensation in the cooling fin 22 can be promoted, so that dehumidification of air inside the housing 6 can be promoted. As described above, when a condition of air inside the housing 6 corresponds to that in the dehumidification-priority region, the cooling fan 13 is stopped so as to perform control of promoting dehumidification of the air. The operation control unit 71 may reduce rotation speed of the cooling fan 13 in order to promote dehumidification of air.

When temperature detected by the temperature sensor 31 is equal to or more than the temperature reference value and humidity detected by the humidity sensor 41 is less than the humidity reference value, the operation control unit 71 controls the cooling fan 13 so as to be driven. For example, the cooling fan 13 can be driven at a maximum speed. When the cooling fan 13 is driven, cooled air is returned to the inside of the housing 6, as indicated by the arrow 93. Thus, temperature inside the housing 6 is reduced. The heat transfer device 8 has a function of cooling the air inside the housing 6 in addition to a function of dehumidifying air inside the housing 6. When the cooling fan 13 is driven, air inside the housing 6 continuously collides with the cooling fin 22. The heat exchange can be promoted in the cooling fin 22. As described above, when a condition of air inside the housing 6 corresponds to that in the cooling-priority region, the cooling fan 13 is driven so as to perform control of promoting cooling of the air. Alternatively, when the cooling fan 13 is driven, the rotation speed of the cooling fan 13 may be increased in order to promote cooling of air.

The laser apparatus 1 of the present embodiment is capable of automatically switching between control giving priority to cooling and control giving priority to dehumidification. The controller 7 can control the cooling fan 13 so as to adjust temperature and humidity in an interior space of the housing 6 within an appropriate range. As a result, a failure of each of the devices included in the laser apparatus 1 due to temperature or humidity can be suppressed. In addition, humidity of air inside the housing 6 can be prevented from reaching the humidity upper limit value. This prevents the laser apparatus 1 from automatically stopping due to high humidity of air inside the housing 6. This also enables temperature of air inside the housing 6 to be prevented from reaching the temperature upper limit value. This prevents the laser apparatus 1 from automatically stopping due to high temperature of air inside the housing 6.

With reference to FIG. 4, any control can be performed in a region A and a region B other than the dehumidification-priority region and the cooling-priority region. For example, for the region A and the region B, the same control as that in the dehumidification-priority region, or the same control as that in the cooling-priority region, can be selected. Alternatively, the same control as that in the dehumidification-priority region and the same control as that in the cooling-priority region may be performed while is switched every predetermined time. Further, control different form that in the dehumidification-priority region and control different form that in cooling-priority region may be performed in the region A and the region B. For example, in the first control described above, the cooling fan 13 is stopped in the dehumidification-priority region while the cooling fan 13 is driven at a maximum speed in the cooling-priority region. In contrast, in the region A and the region B, the cooling fan 13 may be continuously driven at a predetermined medium speed.

Next, second control of the laser apparatus 1 of the present embodiment will be described. The second control is performed when a condition of air inside the housing 6 corresponds to that in the dehumidification-priority region.

Figure 5:
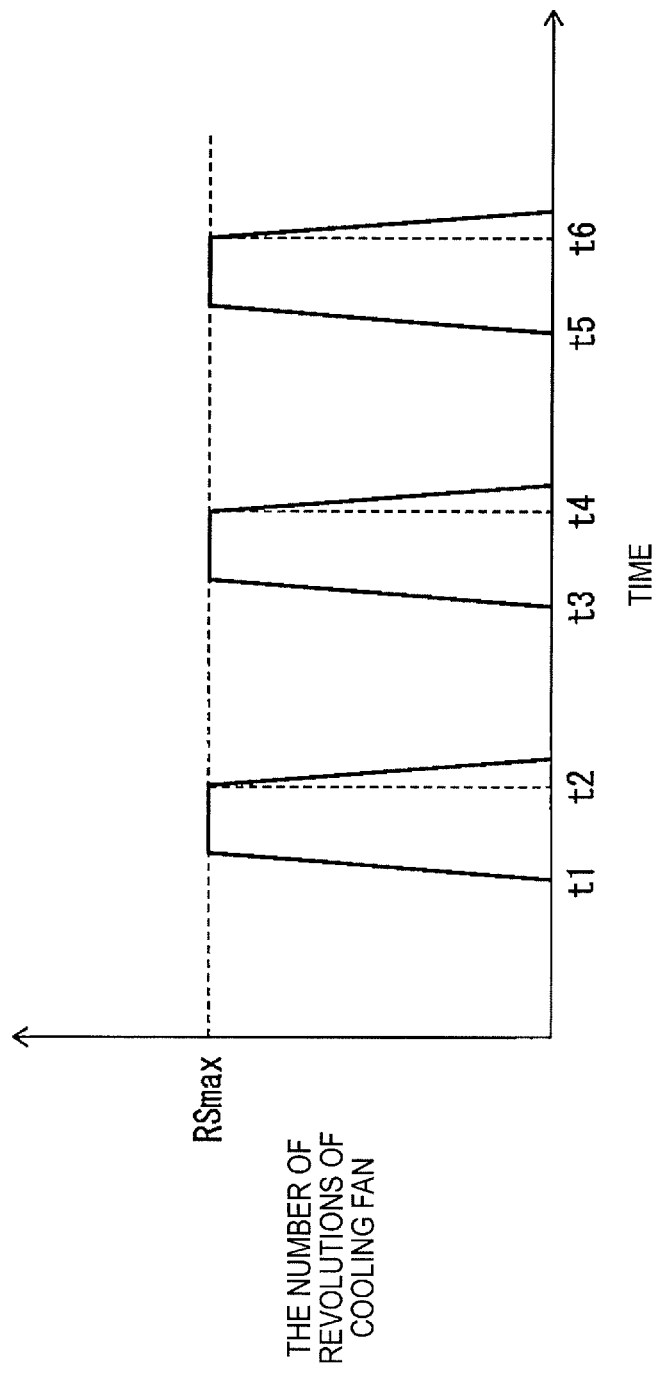
FIG. 5 is a graph for illustrating second control of the laser apparatus of the first embodiment.

FIG. 5 shows a graph for illustrating the second control of the laser apparatus of the present embodiment. The horizontal axis represents time, and the vertical axis represents the number of revolutions (rotation speed) of the cooling fan 13 of the heat transfer device 8. In the second control, control for varying rotation speed of the cooling fan 13 in a predetermined cycle is performed when a condition of air inside the housing 6 corresponds to that in the dehumidification-priority region. The operation control unit 71 causes the cooling fan 13 to be stopped until time t1. At time t1, the operation control unit 71 causes the cooling fan 13 to be driven at a maximum rotation speed. The cooling fan 13 is stopped after is driven for a predetermined time. At time t2, the operation control unit 71 transmits a command for stopping the cooling fan 13. Then, the number of revolutions of the cooling fan 13 becomes zero. After that, the cooling fan 13 is stopped for a predetermined time until time t3. After time t3, this control is repeated. In the second control, the control for driving and stopping the cooling fan 13 as described above are repeated.

Water droplets generated due to condensation adhere to the cooling fin 22. The water adhering to the cooling fin 22 drops into the water storage tank 61 by repeating the drive and stop of the cooling fan 13. This enables condensation to be promoted in the cooling fin 22.

A time period in which the cooling fan 13 is driven and a time period in which it is stopped can be appropriately set. For example, the time period in which the cooling fan 13 is driven (e.g., a time period from time t1 to time t2) can be increased more than the time period in which the cooling fan 13 is stopped (e.g., a time period from time t2 to time t3). It is preferable that a stopping period of the cooling fan 13 is not too long. For example, it is preferable that the stopping period of the cooling fan 13 is about ten minutes at most. Furthermore, during a period in which the cooling fan 13 is stopped by performing the first control described above, the second control may be performed every predetermined time.

In the present embodiment, the operation control unit 71 repeats control of stopping the cooling fan 13 and control of driving the cooling fan 13 at a maximum rotation speed. By adopting this control, the amount of air blown from the cooling fan 13 is greatly varied, so that water droplets adhering to the cooling fin 22 can be effectively dropped. Control of varying rotation speed is not limited to this aspect, and any method of varying rotation speed can be used.

As described above, the operation control unit 71 can perform the control of varying rotation speed of the cooling fan 13 in a predetermined cycle when temperature detected by the temperature sensor 31 is less than the temperature reference value and humidity detected by the humidity sensor is equal to or more than the humidity reference value. In contrast, when temperature detected by the temperature sensor 31 is equal to or more than the temperature reference value, the operation control unit 71 stops the control of varying rotation speed. The operation control unit 71 also stops the control of varying rotation speed when humidity detected by the humidity sensor 41 is less than the humidity reference value. That is, the operation control unit 71 is capable of stopping the control of varying rotation speed in a predetermined cycle, in a region other than the dehumidification-priority region. Another control is similar to the first control of the laser apparatus 1, so that duplicated description is here eliminated.

Next, third control of the laser apparatus 1 of the present embodiment will be described. In the third control, the operation control unit 71 controls at least one of rotation direction of the stirring fan 14 and rotation direction of the cooling fan 13. First, control of rotation direction of the stirring fan 14 will be described. With reference to FIG. 1, the stirring fan 14 has a function of stirring air inside the housing 6. In the third control, when a condition of air inside the housing 6 corresponds to that in the cooling-priority region, the operation control unit 71 performs control of varying rotation direction of the impeller 14b of the stirring fan 14 in a predetermined cycle.

Figure 6:
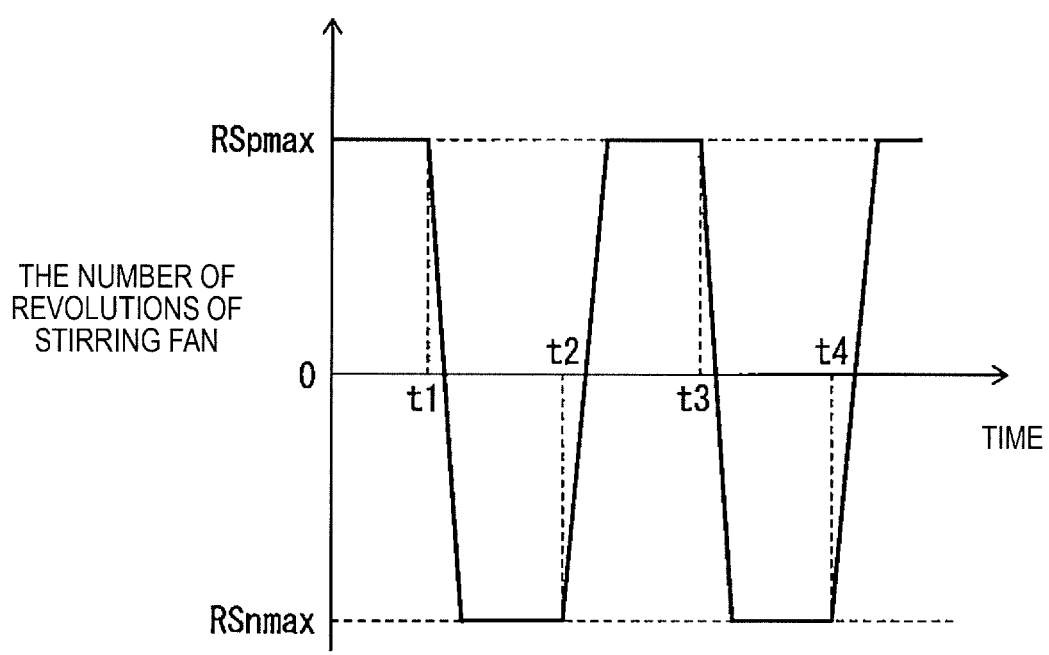
FIG. 6 is a graph for illustrating third control of the laser apparatus of the first embodiment.

FIG. 6 shows a time chart of the third control of the laser apparatus of the present embodiment. The operation control unit 71 causes the impeller 14b of the stirring fan 14 to rotate in one direction (forward direction) until time t1. Then, the operation control unit 71 detects that a condition of air inside the housing 6 corresponds to that in the cooling-priority region. At time t1, the operation control unit 71 controls the impeller 14b so as to rotate in the other direction (reverse direction). That is, the impeller 14b is rotated in the reverse direction so as to reverse direction of air blown from the stirring fan 14. At time t2 after operation is continued for a predetermined time, the operation control unit 71 causes the impeller 14b to return to rotate in the one direction. As described above, the operation control unit 71 repeats control of rotating the impeller 14b in a forward direction and control of rotating the impeller 14b in a reverse direction. In a region other than the cooling-priority region, the operation control unit 71 stops the control of varying rotation direction of the impeller 14b in a predetermined cycle.

When the control of varying rotation direction of the impeller 14b is performed in the cooling-priority region, direction of air blown from the stirring fan 14 can be periodically varied. This enables air inside the housing 6 to be effectively stirred, so that cooling efficiency can be increased.

In the present embodiment, the operation control unit 71 repeats control of driving the stirring fan 14 in one direction at a maximum speed and control of driving the stirring fan 14 in the other direction at a maximum speed That is, when is driven, the stirring fan 14 is driven at a maximum speed. By performing this control, the amount of air blown from the stirring fan 14 increases, so that air inside the housing 6 can be effectively stirred. The stirring fan 14 may be driven at a speed other than the maximum speed. The control of varying rotation direction of the impeller 14b in a predetermined cycle may be performed continuously. Alternatively, the control of varying rotation direction of the impeller 14b in a predetermined cycle may be performed intermittently every predetermined time interval.

While control of the stirring fan 14 is exemplified in the description above, the cooling fan 13 of the heat transfer device 8 also has a function of stirring air inside the housing 6 as previously discussed. The laser apparatus 1 of the present embodiment includes at least one fan that stirs air inside the housing 6. As the fan that stirs air inside the housing 6, the cooling fan 13 of the heat transfer device 8 and the stirring fan 14 can be exemplified. Control similar to the control of the stirring fan 14 can be also performed on the cooling fan 13. That is, control of varying rotation direction of the impeller 13b in a predetermined cycle can be performed in the cooling-priority region, also for the cooling fan 13.

The operation control unit 71 can perform control of the cooling fan 13 and control of the stirring fan 14 at the same time. Alternatively, the operation control unit 71 can perform any one of the control of the cooling fan 13 and the control of the stirring fan 14.

As described above, in the third control, the operation control unit 71 can perform control of varying rotation direction of the impeller of at least one of the stirring fan 14 and the cooling fan 13 in a predetermined cycle when temperature detected by the temperature sensor 31 is equal to or more then the temperature reference value and humidity detected by the humidity sensor 41 is less than the humidity reference value.

In contrast, at least one case among a case where temperature detected by the temperature sensor 31 is less than the temperature reference value and a case where humidity detected by the humidity sensor 41 is equal to or more than the humidity reference value, control of varying rotation direction of the impeller in a predetermined cycle can be stopped. Another control is similar to the first control of the laser apparatus 1, so that duplicated description is here eliminated.

Second Embodiment

Figure 7:
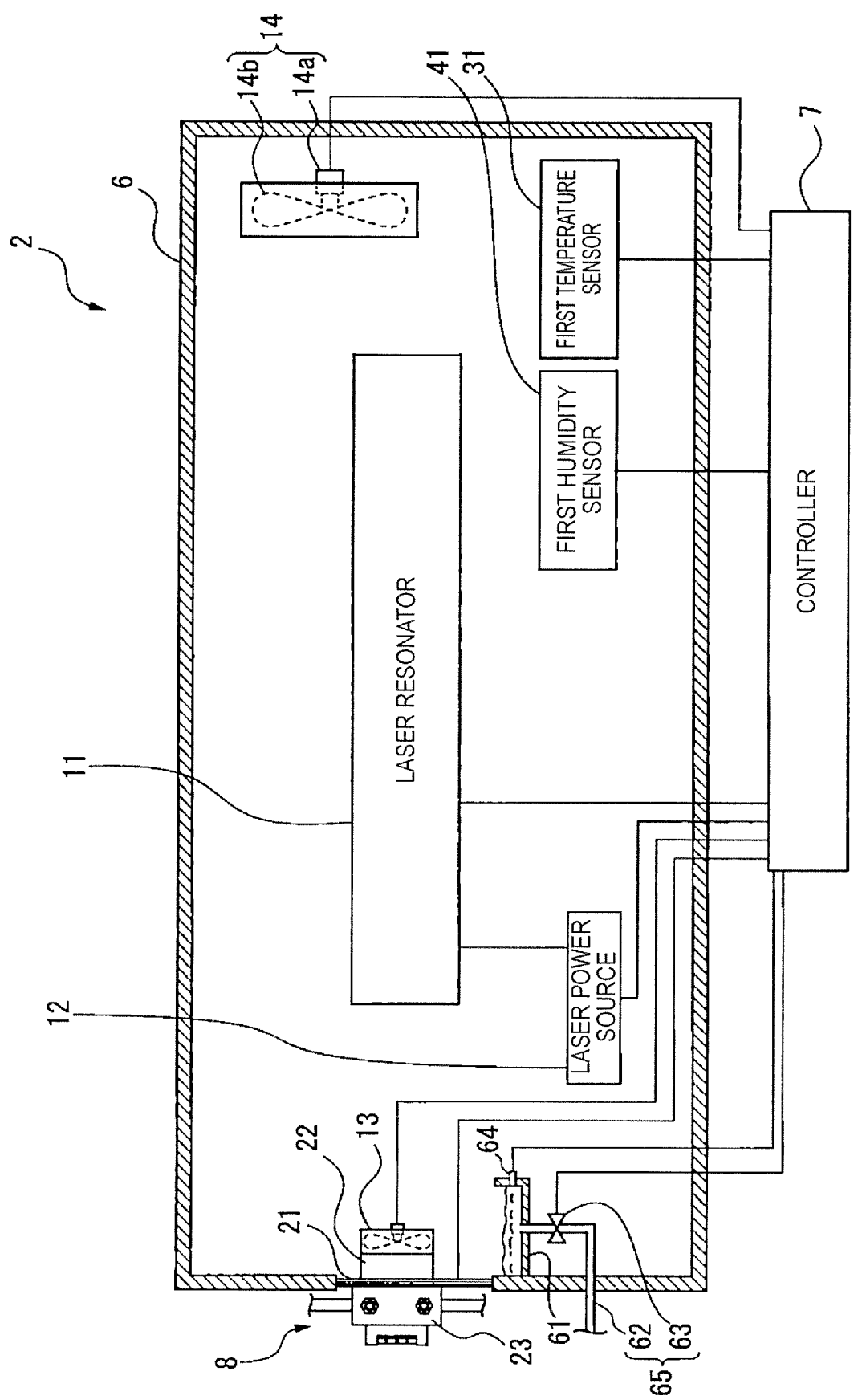
FIG. 7 is a schematic view of a laser apparatus of a second embodiment.

With reference to FIG. 7, a laser apparatus of a second embodiment will be described. FIG. 7 shows a schematic view of the laser apparatus of the present embodiment. A laser apparatus 2 includes a drain device 65 that discharges water stored in a water storage tank 61 serving as a water storage part to the outside of a housing 6. The drain device 65 of the present embodiment includes a drain pipe 62 connected to the water storage tank 61, and a drain valve 63 connected to some midpoint in the drain pipe 62. The drain device 65 is controlled by a controller 7. The drain valve 63 is controlled by an operation control unit 71 of the controller 7.

The laser apparatus 2 includes a water storage sensor 64 that detects the amount of water stored in the water storage tank 61. As the water storage sensor 64, a sensor for detecting water pressure, a sensor for detecting a water level, or the like can be used. A signal of the amount of water detected by the water storage sensor 64 is transmitted to the controller 7.

The storage unit 72 of the controller 7 stores a temperature reference value associated with temperature, a humidity reference value associated with humidity, and a stored-water-amount reference value associated with the amount of water stored in the water storage tank 61, for control of the drain device 65. The temperature reference value and the humidity reference value of the laser apparatus 2 of the present embodiment are identical to the temperature reference value and the humidity reference value in the laser apparatus 1 according to the first embodiment, respectively (refer to FIG. 4). The temperature reference value and the humidity reference value are not limited to this aspect, and any value for control of the drain device can be used. As the stored-water-amount reference value, the amount of water that does not overflow the water storage tank 61 can be used. That is, a value less than a maximum water storage capacity of the water storage tank 61 can be used.

With reference to FIGS. 4 and 7, the operation control unit 71 controls the drain device 65 so as to drain water in the water storage tank 61 in a predetermined cycle when a condition of air inside the housing 6 corresponds to that in the dehumidification-priority region. The operation control unit 71 performs control of periodical drain regardless of the amount of water in the water storage tank 61. The operation control unit 71 causes the drain valve 63 to open, whereby water stored in the water storage tank 61 is discharged to the outside of the housing 6. As described above, the operation control unit 71 controls the drain device 65 so as to drain water in the water storage tank 61 in a predetermined cycle when temperature detected by the temperature sensor 31 is lower than the temperature reference value and humidity detected by the humidity sensor 41 is equal to or higher than the humidity reference value. An operator can select a cycle in which water is slightly stored in the water storage tank 61, for example.

The dehumidification-priority region is a region having high humidity of air inside the housing 6. The operation control unit 71 causes water in the water storage tank 61 to be periodically drained, whereby much water can be prevented from remaining in the water storage tank 61. This prevents water stored in the water storage tank 61 from evaporating, so that increase in humidity can be suppressed.

In contrast, under a condition in which air inside the housing 6 corresponds to that in the cooling-priority region, the operation control unit 71 controls the drain device 65 so as to drain the water storage tank 61 when the amount of water in the water storage tank 61 exceeds the stored-water-amount reference value over. That is, the operation control unit 71 performs control to open the drain valve 63 after waiting until the amount of water in the water storage tank 61 is increased. As described above, the operation control unit 71 detects that temperature detected by the temperature sensor 31 is equal to or more than the temperature reference value and humidity detected by the humidity sensor 41 is less than the humidity reference value. Then, the operation control unit 71 controls the drain device 65 so as to drain water in the water storage tank 61 when the amount of water in the water storage tank 61 exceeds the stored-water-amount reference value.

When the drain valve 63 is opened in the state where the amount of water in the water storage tank 61 is decreased, the inside of the housing 6 may communicate with the outside thereof through the drain pipe 62. This may cause air outside the housing 6 to flow into the inside of the housing 6, thereby the temperature inside the housing 6 is liable to increase. When the amount of water in the water storage tank 61 exceeds the stored-water-amount reference value, the control for opening the drain valve 63 is performed, whereby intrusion of the air outside the housing 6 into the inside of the housing 6 can be suppressed. As a result, increase in temperature of air inside the housing 6 can be suppressed.

While the drain device 65 of the present embodiment includes the drain pipe 62 and the drain valve 63, the drain device 65 is not limited to this aspect. The drain device can have any configuration capable of discharging water stored in the water storage part to the outside of the housing. For example, a door that opens or closes the housing may be disposed so as to communicate with the water storage tank. Alternatively, the drain device may include a pump for discharging water stored in the water storage tank.

Other configurations, actions, and effects of the laser apparatus are similar to those of the first embodiment, so that duplicated description is here eliminated.

Third Embodiment

Figure 8:
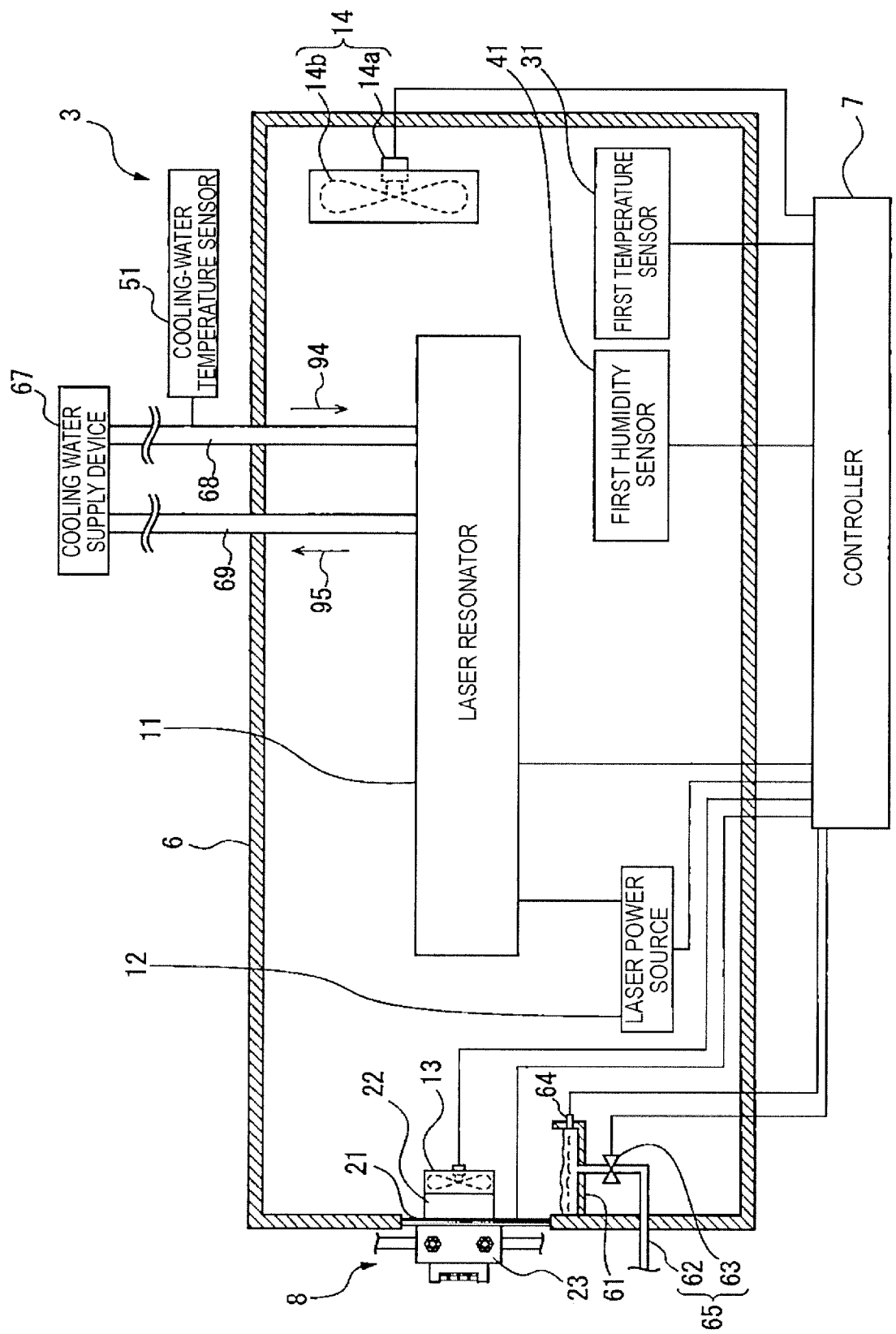
FIG. 8 is a schematic view of a laser apparatus of a third embodiment.

With reference to FIG. 8, a laser apparatus of a third embodiment will be described. FIG. 8 shows a schematic view of the laser apparatus of the present embodiment. A laser apparatus 3 of the present embodiment includes a cooling device that cools a device disposed inside a housing 6. As the device disposed inside the housing 6, a laser resonator 11 will be described as an example. The laser apparatus 3 includes a cooling water supply device 67 that supplies cooling water to the laser resonator 11. The cooling water supply device 67 supplies cooling water to the laser resonator 11 through a supply pipe 68, as indicated by an arrow 94. The cooling water returns to the cooling water supply device 67 through a return pipe 69, as indicated by an arrow 95. The cooling water supply device 67 is controlled by an operation control unit 71 of a controller 7.

The laser apparatus 3 includes a cooling-water temperature sensor 51 that detects temperature of cooling water to be supplied to the laser resonator 11. The cooling-water temperature sensor 51 of the present embodiment is disposed so as to detect temperature of water flowing through the supply pipe 68. The cooling-water temperature sensor for detecting temperature of cooling water may be disposed so as to detect temperature of cooling water flowing through the return pipe.

Temperature of a component disposed in the laser resonator 11 depends on temperature of cooling water. That is, the lower temperature of the cooling water is, the more largely the component is reduced in temperature. Thus, condensation is likely to occur in the component. Alternatively, the lower temperature of the cooling water is, the more easily condensation occurs around a pipe of the cooling water. The operation control unit 71 is capable of calculating humidity that causes condensation to occur inside the housing 6 on the basis of temperature of air inside the housing 6 detected by a first temperature sensor 31 and temperature of cooling water detected by the cooling-water temperature sensor 51. The operation control unit 71 can set humidity less than the humidity that causes condensation to occur as a humidity reference value. For example, the operation control unit 71 may set a value acquired by subtracting a predetermined margin from the humidity that causes condensation to occur as the humidity reference value. The humidity reference value set is stored in a storage unit 72. Then, the controller 7 is capable of performing the control of each of the first and second embodiments by using this humidity reference value.

The laser apparatus 3 of the present embodiment is capable of setting the humidity reference value in accordance with actual temperature of cooling water. The operation control unit 71 is capable of setting the humidity reference value lower as temperature of cooling water decreases. This control enables an optimum humidity reference value to be set. When an operator sets the humidity reference value, the humidity reference value needs to be set so as to include a large margin. This may cause the humidity reference value to be set to a low value. In contrast, the laser apparatus 3 sets the humidity reference value in accordance with actual temperature of cooling water, so that the margin described above can be reduced. As a result, the dehumidification-priority region is reduced, whereby the cooling-priority region can be increased.

The laser apparatus 3 of the present embodiment is capable of performing control giving priority to cooling, and control giving priority to dehumidifying when condensation is likely to occur. That is, the control giving priority to dehumidifying can be performed only when condensation is likely to occur. As a result, air can be effectively cooled.

Other configurations, actions, and effects of the laser apparatus are similar to those of the first and second embodiments, so that duplicated description is here eliminated.

Fourth Embodiment

Figure 9:
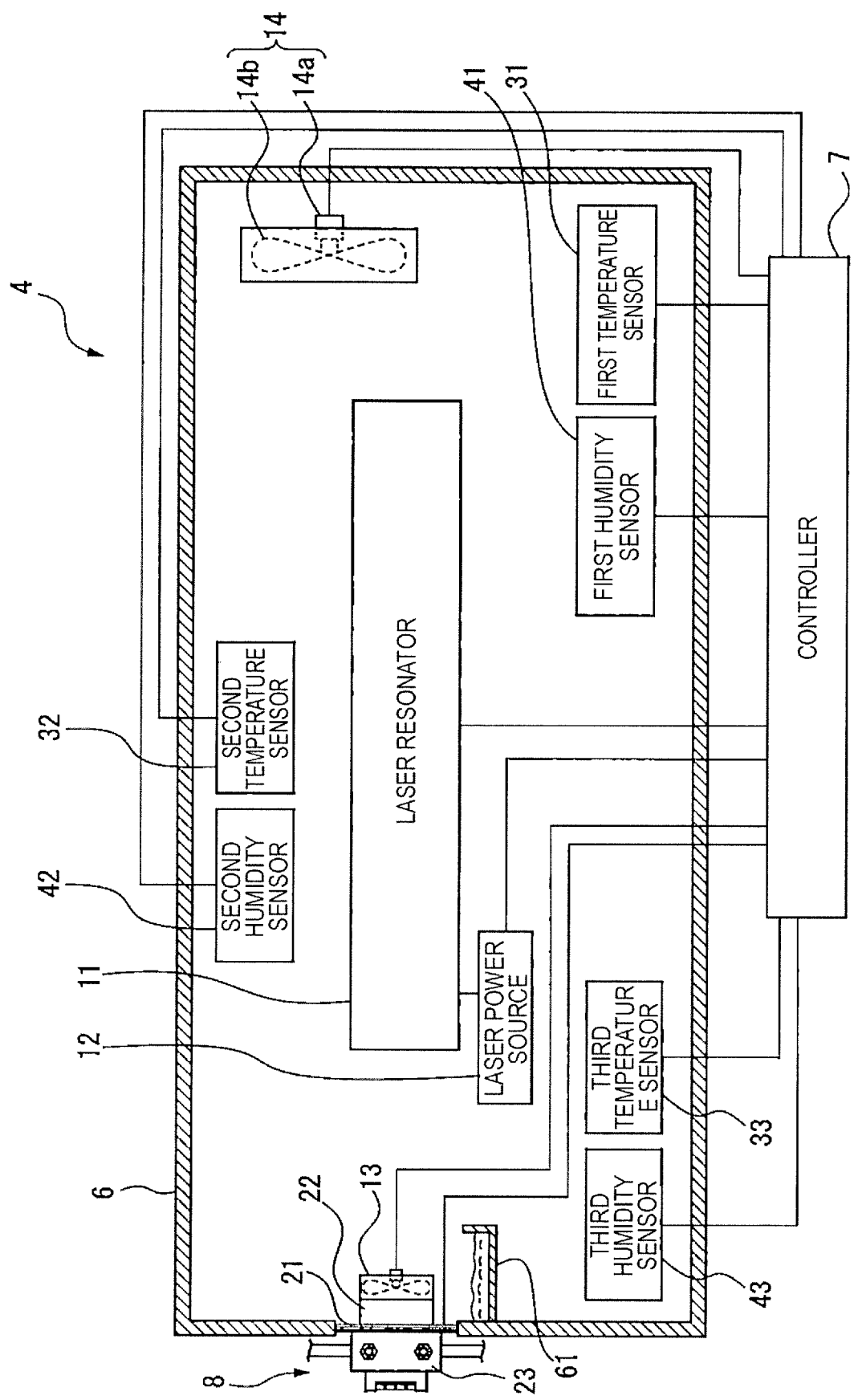
FIG. 9 is a schematic view of a laser apparatus of a fourth embodiment.

With reference to FIG. 9, a laser apparatus of a fourth embodiment will be described. FIG. 9 shows a schematic view of the laser apparatus of the present embodiment. A laser apparatus 4 of the present embodiment includes at least one fan that stirs air inside the housing 6. In the present embodiment, a cooling fan 13 and a stirring fan 14 each have a function of cooling air inside the housing 6. The laser apparatus 4 includes a plurality of temperature sensors 31, 32, and 33 each configured to detect temperature of air inside the housing 6, and a plurality of humidity sensors 41, 42, and 43 each configured to detect humidity of the air inside the housing 6. That is, the laser apparatus 4 includes the second temperature sensor 32 and the third temperature sensor 33 in addition to the first temperature sensor 31. The laser apparatus 4 also includes the second humidity sensor 42 and the third humidity sensor 43 in addition to the first humidity sensor 41.

The plurality of temperature sensors 31, 32, and 33 are disposed at respective positions away from each other inside the housing 6. The plurality of humidity sensors 41, 42, and 43 are disposed at respective positions away from each other inside the housing 6. It is preferable that the temperature sensors and the humidity sensors are disposed so as to have, respectively, a large distance among the temperature sensors and a large distance among the humidity sensors.

Inside the housing 6, temperature of the air may be uneven so to cause temperature distribution. When the temperature of the air is uneven, the control based on accurate temperature may not be performed. Alternatively, cooling of air may not be efficiently performed.

In a first control of the laser apparatus 4 of the present embodiment, the controller 7 detects spread of the temperature distribution inside the housing 6. When there is a large spread of the temperature distribution, the controller 7 performs control for promoting stirring of air inside the housing 6.

An operator sets a temperature-distribution reference value with respect to a variable associated with temperature distribution inside the housing 6. The temperature-distribution reference value is stored in a storage unit 72. As the variable associated with temperature distribution, a difference (Tmax−Tmin) between a maximum value and a minimum value of a plurality of temperatures detected by the plurality of temperature sensors 31, 32, and 33 can be used. Alternatively, as the variable associated with temperature distribution, a standard deviation of the plurality of temperatures can be used.

The variable associated with temperature distribution is not limited to this aspect. As the variable associated with temperature distribution, any variable enabling determination of a state in which a deviation of the temperatures occurs can be used. For example, a reference temperature sensor is selected from among a plurality of temperature sensors. Then, a maximum value of differences between a temperature detected by the reference temperature sensor and temperatures detected by other respective temperature sensors may be used.

The operation control unit 71 of the controller 7 acquires temperature from each of the plurality of temperature sensors 31, 32, and 33. The operation control unit 71 calculates the variable associated with temperature distribution on the basis of a plurality of temperatures detected by the respective plurality of temperature sensors 31, 32, and 33. The operation control unit 71 compares the variable associated with temperature distribution with the temperature-distribution reference value. The operation control unit 71 controls at least one of the stirring fan 14 and the cooling fan 13 so as to operate when the variable associated with temperature distribution is equal to or more than the temperature-distribution reference value.

For example, the operation control unit 71 enables both the stirring fan 14 and the cooling fan 13 to be driven when the stirring fan 14 and the cooling fan 13 are stopped. Alternatively, the operation control unit 71 enables one of the stirring fan 14 and the cooling fan 13 to be driven when the stirring fan 14 and the cooling fan 13 are stopped. In addition, the operation control unit 71 can drive the fan that is stopped among the stirring fan 14 and the cooling fan 13.

Further, an operator may predetermine a first determination value with respect to the variable associated with temperature distribution in addition to the temperature-distribution reference value. The first determination value for temperature can be set to a value more than the temperature-distribution reference value. The operation control unit 71 can cause both the stirring fan 14 and the cooling fan 13 to be driven when the variable associated with temperature distribution is more than the first determination value. In contrast, when the variable associated with temperature distribution is equal to or more than the temperature-distribution reference value and less than the first determination value, the operation control unit 71 can perform control of driving only one of the stirring fan 14 and the cooling fan 13.

The operation control unit 71 may perform control of increasing rotation speed of at least one of the stirring fan 14 and the cooling fan 13 when the variable associated with temperature distribution is equal to or more than the temperature-distribution reference value.

Next, the operation control unit 71 controls at least one of the stirring fan 14 and the cooling fan 13 so as to be stopped when the variable associated with temperature distribution is less than the temperature-distribution reference value. For example, the operation control unit 71 enables both the stirring fan 14 and the cooling fan 13 to be stopped when the stirring fan 14 and the cooling fan 13 are driven. Alternatively, the operation control unit 71 enables only one of the stirring fan 14 and the cooling fan 13 to be stopped when the stirring fan 14 and the cooling fan 13 are driven. In addition, the operation control unit 71 can stop the fan that is driven among the stirring fan 14 and the cooling fan 13.

Further, an operator may predetermine a second determination value with respect to the variable associated with temperature distribution in addition to the temperature-distribution reference value. The second determination value for temperature can be set to a value less than the temperature-distribution reference value. The operation control unit 71 can cause both the stirring fan 14 and the cooling fan 13 to be stopped when the variable associated with temperature distribution is less than the second determination value. In contrast, when the variable associated with temperature distribution is more than the second determination value and less than the temperature-distribution reference value, the operation control unit 71 can perform control of stopping only one of the stirring fan 14 and the cooling fan 13.

The operation control unit 71 may perform control of reducing rotation speed of at least one of the stirring fan 14 and the cooling fan 13 when the variable associated with temperature distribution is less than the temperature-distribution reference value.

The first control of the laser apparatus 4 of the present embodiment enables temperature of air inside the housing 6 to be uniform when there is a large difference in temperature distribution inside the housing 6. This enables cooling to be efficiently performed. When there is a small difference in temperature distribution inside the housing 6, at least one of the stirring fan 14 and the cooling fan 13 can be stopped. This control enables unnecessary driving of the fans to be avoided. That is, the fans each can be driven efficiently.

In the laser apparatus 4 of the present embodiment, control of humidity can be performed by a method similar to the control of temperature. Inside the housing 6, humidity of the air may be uneven so as to cause humidity distribution. When the humidity of the air is uneven, the control based on humidity may not be performed accurately. Alternatively, dehumidification of air may not be efficiently performed.

In the second control of the laser apparatus 4 of the present embodiment, the controller 7 detects a spread of humidity distribution inside the housing 6. When there is a large spread in humidity distribution, the controller 7 performs the control for promoting stirring of air inside the housing 6.

An operator sets a humidity-distribution reference value with respect to a variable associated with humidity distribution inside the housing 6. The humidity-distribution reference value is stored in the storage unit 72. As the variable associated with humidity distribution, a difference (Hmax−Hmin) between a maximum value and a minimum value of relative humidity detected by the plurality of humidity sensors 41, 42, and 43 can be used. Alternatively, as the variable associated with humidity distribution, a standard deviation of the plurality of relative humidity can be used.

The variable associated humidity distribution is not limited to this aspect. As the variable associated humidity distribution, any variable enabling determination of a state of causing a deviation among relative humidity can be used. For example, a reference humidity sensor is selected from among a plurality of humidity sensors. Then, a maximum value of differences between a humidity detected by the reference humidity sensor and relative humidity detected by other respective humidity sensors may be used.

The operation control unit 71 of the controller 7 acquires humidity from each of the plurality of humidity sensor 41, 42, and 43. The operation control unit 71 calculates the variable associated with humidity distribution on the basis of relative humidity detected by the respective plurality of humidity sensors 41, 42, and 43. The operation control unit 71 compares the variable associated with humidity with the humidity-distribution reference value. The operation control unit 71 controls at least one of the stirring fan 14 and the cooling fan 13 so as to operate when the variable associated with humidity distribution is equal to or more than the humidity-distribution reference value.

For example, the operation control unit 71 enables both the stirring fan 14 and the cooling fan 13 to be driven when the stirring fan 14 and the cooling fan 13 are stopped. Alternatively, the operation control unit 71 enables one of the stirring fan 14 and the cooling fan 13 to be driven when the stirring fan 14 and the cooling fan 13 are stopped. In addition, the operation control unit 71 can drive the fan that is stopped among the stirring fan 14 and the cooling fan 13.

Further, an operator may predetermine a first determination value with respect to the variable associated with humidity distribution in addition to the humidity-distribution reference value. The first determination value for humidity may be set to a value more than the humidity-distribution reference value. The operation control unit 71 can cause both the stirring fan 14 and the cooling fan 13 to be driven when the variable associated with humidity distribution is more than the first determination value. In contrast, when the variable associated with humidity distribution is equal to or more than the humidity-distribution reference value and less than the first determination value, the operation control unit 71 can perform control of driving only one of the stirring fan 14 and the cooling fan 13.

The operation control unit 71 may perform control of increasing rotation speed of at least one of the stirring fan 14 and the cooling fan 13 when the variable associated with humidity distribution is equal to or more than the humidity-distribution reference value.

Next, the operation control unit 71 controls at least one of the stirring fan 14 and the cooling fan 13 so as to be stopped when the variable associated with humidity distribution is less than the humidity-distribution reference value. For example, the operation control unit 71 enables both the stirring fan 14 and the cooling fan 13 to be stopped when the stirring fan 14 and the cooling fan 13 are driven. Alternatively, the operation control unit 71 enables one of the stirring fan 14 and the cooling fan 13 to be stopped when the stirring fan 14 and the cooling fan 13 are driven. In addition, the operation control unit 71 can stop the fan that is driven among the stirring fan 14 and the cooling fan 13.

Further, an operator may predetermine a second determination value of the variable associated with humidity distribution in addition to the humidity-distribution reference value. The second determination value for humidity can be set to a value less than the humidity-distribution reference value. The operation control unit 71 can cause both the stirring fan 14 and the cooling fan 13 to be stopped when the variable associated with humidity distribution is less than the second determination value. In contrast, when the variable associated with humidity is more than the second determination value and less than the humidity-distribution reference value, the operation control unit 71 can perform control of stopping only one of the stirring fan 14 and the cooling fan 13.

The operation control unit 71 may perform control of reducing rotation speed of at least one of the stirring fan 14 and the cooling fan 13 when the variable associated with humidity distribution is less than the humidity-distribution reference value.

In the second control of the laser apparatus 4 of the present embodiment, humidity of air inside the housing 6 can be uniform when there is a large difference in humidity distribution inside the housing 6. This enables dehumidifying to be efficiently performed. When there is a small difference in humidity distribution inside the housing 6, at least one of the stirring fan 14 and the cooling fan 13 can be stopped. By adopting this control, unnecessary drive of the fans can be avoided. That is, the fans can be driven efficiently.

As described above, the laser apparatus 4 of the present embodiment can uniformize temperature of air inside housing and humidity of air inside housing while avoiding excess drive of the fan. In addition, the laser apparatus 4 can accurately perform the control based on temperature or the control based on humidity.

Other configurations, actions, and effects of the laser apparatus are similar to those of the first to third embodiments, so that duplicated description is here eliminated.

While the laser apparatus described in each of the first to fourth embodiments above is a fiber laser apparatus, the laser apparatus is not limited to this aspect, and thus the laser apparatus including an arbitrary laser resonator can be used. For example, a semiconductor laser apparatus including a laser diode as a light emitting source, a carbonic acid gas laser apparatus including a discharge tube filled with a carbonic acid gas, or the like can be used.

The laser apparatus of each of the embodiments of the present disclosure is capable of controlling a device included in the laser apparatus such that temperature and humidity in an interior space of a housing are adjusted within an appropriate range.

The above-described embodiments can be combined as appropriate. Identical or equivalent parts are given identical reference numerals in the above-described drawings. Note that the above-described embodiments are merely examples and are not intended to limit the invention. Changes to the embodiments as indicated in the claims are also included in the embodiments.

The invention claimed is:

1. A laser apparatus comprising:
a laser resonator configured to oscillate a laser beam;
a housing configured to seal a space in which the laser resonator is disposed in an airtight manner;
a temperature sensor configured to detect temperature of air inside the housing;
a humidity sensor configured to detect humidity of the air inside the housing;
a heat transfer device including a high-temperature part, a low-temperature part at a temperature lower than that of the high-temperature part, the low-temperature part being disposed inside the housing, and a cooling fan configured to generate a flow of air in the low-temperature part, and configured to transfer heat in the low-temperature part to the high-temperature part; and
a controller including an operation control unit configured to control the cooling fan and a storage unit configured to store predetermined information; wherein
the storage unit stores a temperature reference value associated with temperature and a humidity reference value associated with humidity, for control of the cooling fan,
the operation control unit performs control of stopping the cooling fan when temperature detected by the temperature sensor is lower than the temperature reference value and humidity detected by the humidity sensor is higher than the humidity reference value, and
the operation control unit performs control of driving the cooling fan when temperature detected by the temperature sensor is higher than the temperature reference value and humidity detected by the humidity sensor is lower than the humidity reference value.

2. A laser apparatus according to claim 1, further comprising:
a cooling water supply device configured to supply cooling water for cooling a device disposed inside the housing; and
a cooling-water temperature sensor configured to detect temperature of the cooling water, wherein
the operation control unit sets the humidity reference value on the basis of temperature of the air inside the housing, detected by the temperature sensor, and temperature of the cooling water, detected by the cooling-water temperature sensor, and
the storage unit stores a set humidity reference value.

3. A laser apparatus comprising:
a laser resonator configured to oscillate a laser beam;
a housing configured to seal a space in which the laser resonator is disposed in an airtight manner;
a temperature sensor configured to detect temperature of air inside the housing;
a humidity sensor configured to detect humidity of the air inside the housing;
a heat transfer device including a high-temperature part, a low-temperature part at a temperature lower than that of the high-temperature part, the low-temperature part being disposed inside the housing, and a cooling fan configured to generate a flow of air in the low-temperature part, and configured to transfer heat in the low-temperature part to the high-temperature part; and
a controller including an operation control unit configured to control the cooling fan and a storage unit configured to store predetermined information; wherein
the storage unit stores a temperature reference value associated with temperature and a humidity reference value associated with humidity, for control of the cooling fan,
the operation control unit performs control of varying rotation speed of the cooling fan in a predetermined cycle when temperature detected by the temperature sensor is lower than the temperature reference value and humidity detected by the humidity sensor is higher than the humidity reference value, and
the operation control unit stops the control of varying rotation speed of the cooling fan in a predetermined cycle in at least one case among a case where temperature detected by the temperature sensor is higher than the temperature reference value and a case where humidity detected by the humidity sensor is lower than the humidity reference value.

4. The laser apparatus according to claim 3, wherein the operation control unit repeats control of stopping the cooling fan and control of driving the cooling fan at a maximum rotation speed, as the control of variation in the predetermined cycle.

5. A laser apparatus comprising:
a laser resonator configured to oscillate a laser beam;
a housing configured to seal a space in which the laser resonator is disposed in an airtight manner;

a temperature sensor configured to detect temperature of air inside the housing;
a humidity sensor configured to detect humidity of the air inside the housing;
at least one fan configured to stir air in the housing;
a heat transfer device including a high-temperature part and a low-temperature part at a temperature lower than that of the high-temperature part, the low-temperature part being disposed inside the housing, and configured to transfer heat in the low-temperature part to the high-temperature part; and
a controller including an operation control unit configured to control the fan and a storage unit configured to store predetermined information; wherein
the fan includes at least one of a stirring fan disposed at a position away from the heat transfer device and a cooling fan disposed in the heat transfer device so as to generate a flow of air in the low-temperature part,
the storage unit stores a temperature reference value associated with temperature and a humidity reference value associated with humidity, for control of the fan,
the operation control unit performs control of varying rotation direction of an impeller of at least one of the stirring fan and the cooling fan in a predetermined cycle when temperature detected by the temperature sensor is higher than the temperature reference value and humidity detected by the humidity sensor is lower than the humidity reference value, and
the operation control unit stops the control of varying rotation direction of the impeller in the predetermined cycle in at least one case among a case where temperature detected by the temperature sensor is lower than the temperature reference value and a case where humidity detected by the humidity sensor is higher than the humidity reference value.

6. The laser apparatus according to claim 5, wherein
the operation control unit performs control of repeating control of driving the impeller in one direction at a maximum speed and control of driving the impeller in the other direction at the maximum speed, as the control of varying rotation direction of the impeller in the predetermined cycle.

7. A laser apparatus comprising:
a laser resonator configured to oscillate a laser beam;
a housing configured to seal a space in which the laser resonator is disposed in an airtight manner;
a temperature sensor configured to detect temperature of air inside the housing;
a humidity sensor configured to detect humidity of the air inside the housing;
a heat transfer device including a high-temperature part and a low-temperature part at a temperature lower than that of the high-temperature part, the low-temperature part being disposed inside the housing, and configured to transfer heat in the low-temperature part to the high-temperature part;
a water storage part configured to store water generated in the low-temperature part due to condensation;
a water storage sensor configured to detect an amount of water stored in the water storage part;
a drain device configured to discharge the water stored in the water storage part to the outside of the housing; and
a controller including an operation control unit configured to control the drain device and a storage unit configured to store predetermined information; wherein
the storage unit stores a temperature reference value associated with temperature, a humidity reference value associated with humidity, and a stored-water-amount reference value associated with the amount of water stored in the water storage part, for control of the drain device,
the operation control unit controls the drain device so as to drain water in the water storage part in a predetermined cycle when temperature detected by the temperature sensor is lower than the temperature reference value, and humidity detected by the humidity sensor is higher than the humidity reference value, and
the operation control unit controls the drain device so as to drain water in the water storage part in a case where the amount of water in the water storage part exceeds the stored-water-amount reference value when temperature detected by the temperature sensor is higher than the temperature reference value and humidity detected by the humidity sensor is lower than the humidity reference value.

8. A laser apparatus comprising:
a laser resonator configured to oscillate a laser beam;
a housing configured to seal a space in which the laser resonator is disposed in an airtight manner;
a plurality of temperature sensors each configured to detect temperature of air inside the housing;
at least one fan configured to stir the air inside the housing;
a heat transfer device including a high-temperature part and a low-temperature part at a temperature lower than that of the high-temperature part, the low-temperature part being disposed inside the housing, and configured to transfer heat in the low-temperature part to the high-temperature part; and
a controller including an operation control unit configured to control the fan and a storage unit configured to store predetermined information; wherein
the fan includes at least one of a stirring fan disposed at a position away from the heat transfer device, and a cooling fan disposed in the heat transfer device so as to generate a flow of air in the low-temperature part,
the plurality of temperature sensors are disposed at respective positions away from each other inside the housing,
the storage unit stores a temperature-distribution reference value with respect to a variable associated with temperature distribution inside the housing, and
the operation control unit calculates the variable associated with temperature distribution on the basis of temperatures detected by the plurality of temperature sensors, controls at least one of the stirring fan and the cooling fan so as to operate when the variable associated with temperature distribution is more than the temperature-distribution reference value, and controls at least one of the stirring fan and the cooling fan so as to be stopped when the variable associated with temperature distribution is less than the temperature-distribution reference value.

9. The laser apparatus according to claim 8, wherein
the variable is a difference between a maximum value and a minimum value of a plurality of temperatures detected by the plurality of temperature sensors, or a standard deviation of the plurality of temperatures.

10. A laser apparatus comprising:
a laser resonator configured to oscillate a laser beam;
a housing configured to seal a space in which the laser resonator is disposed in an airtight manner;
a plurality of humidity sensors each configured to detect humidity of air inside the housing;

at least one fan configured to stir the air inside the housing;
a heat transfer device including a high-temperature part and a low-temperature part at a temperature lower than that of the high-temperature part, the low-temperature part being disposed inside the housing, and configured to transfer heat in the low-temperature part to the high-temperature part; and
a controller including an operation control unit configured to control the fan and a storage unit configured to store predetermined information; wherein
the fan includes at least one of a stirring fan disposed at a position away from the heat transfer device, and a cooling fan disposed in the heat transfer device so as to generate a flow of air in the low-temperature part,
the plurality of humidity sensors is disposed at respective positions away from each other inside the housing,
the storage unit stores a humidity-distribution reference value with respect to a variable associated with humidity distribution inside the housing, and
the operation control unit calculates the variable associated with humidity distribution on the basis of relative humidity detected by the plurality of humidity sensors, and controls at least one of the stirring fan and the cooling fan so as to operate when the variable associated with humidity distribution is more than the humidity-distribution reference value, and controls at least one of the stirring fan and the cooling fan so as to be stopped when the variable associated with humidity distribution is less than the humidity-distribution reference value.

11. The laser apparatus according to claim 10, wherein the variable is a difference between a maximum value and a minimum value of relative humidity detected by the plurality of humidity sensors, or a standard deviation of the plurality of relative humidity.

* * * * *